5 Sheets--Sheet 4.

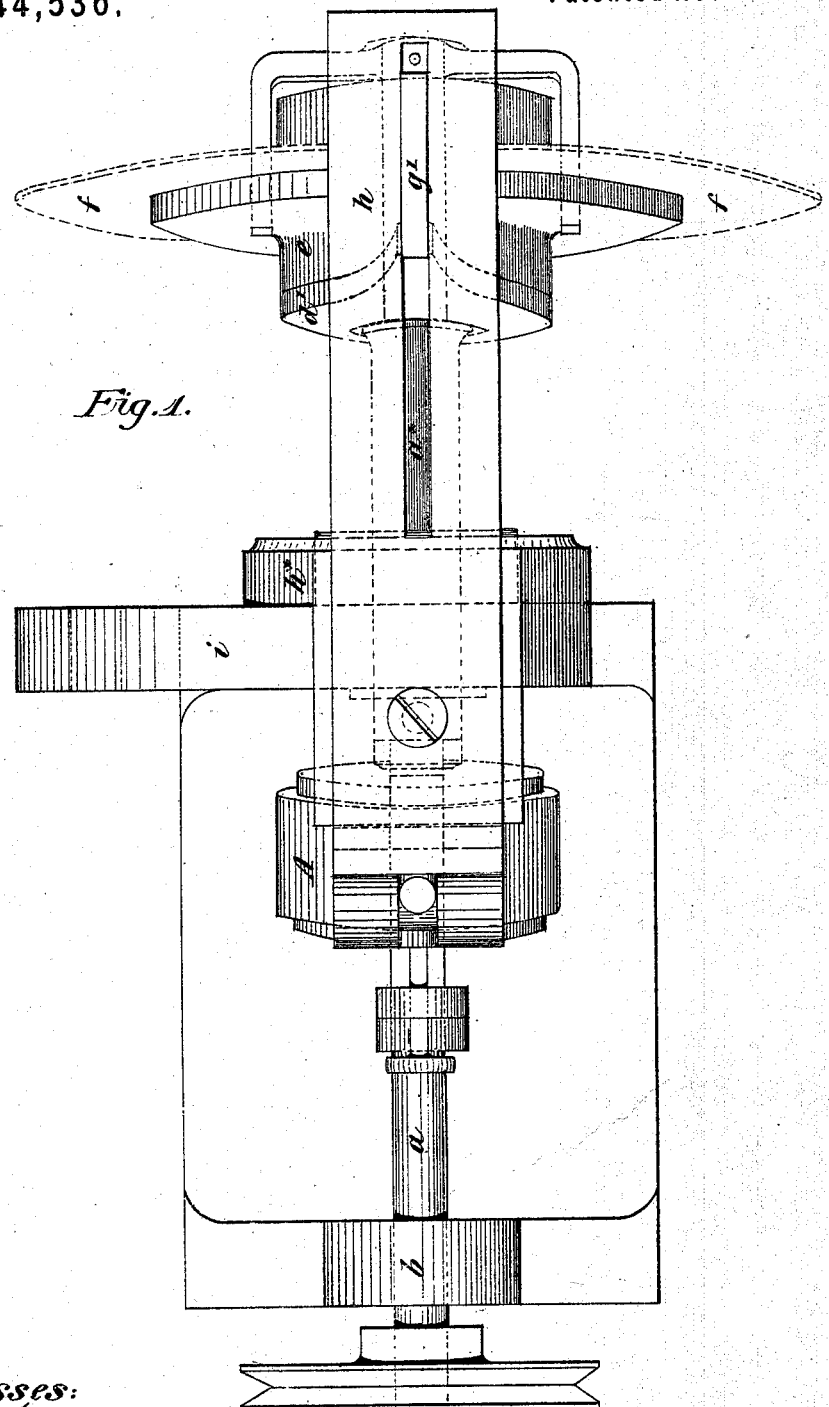

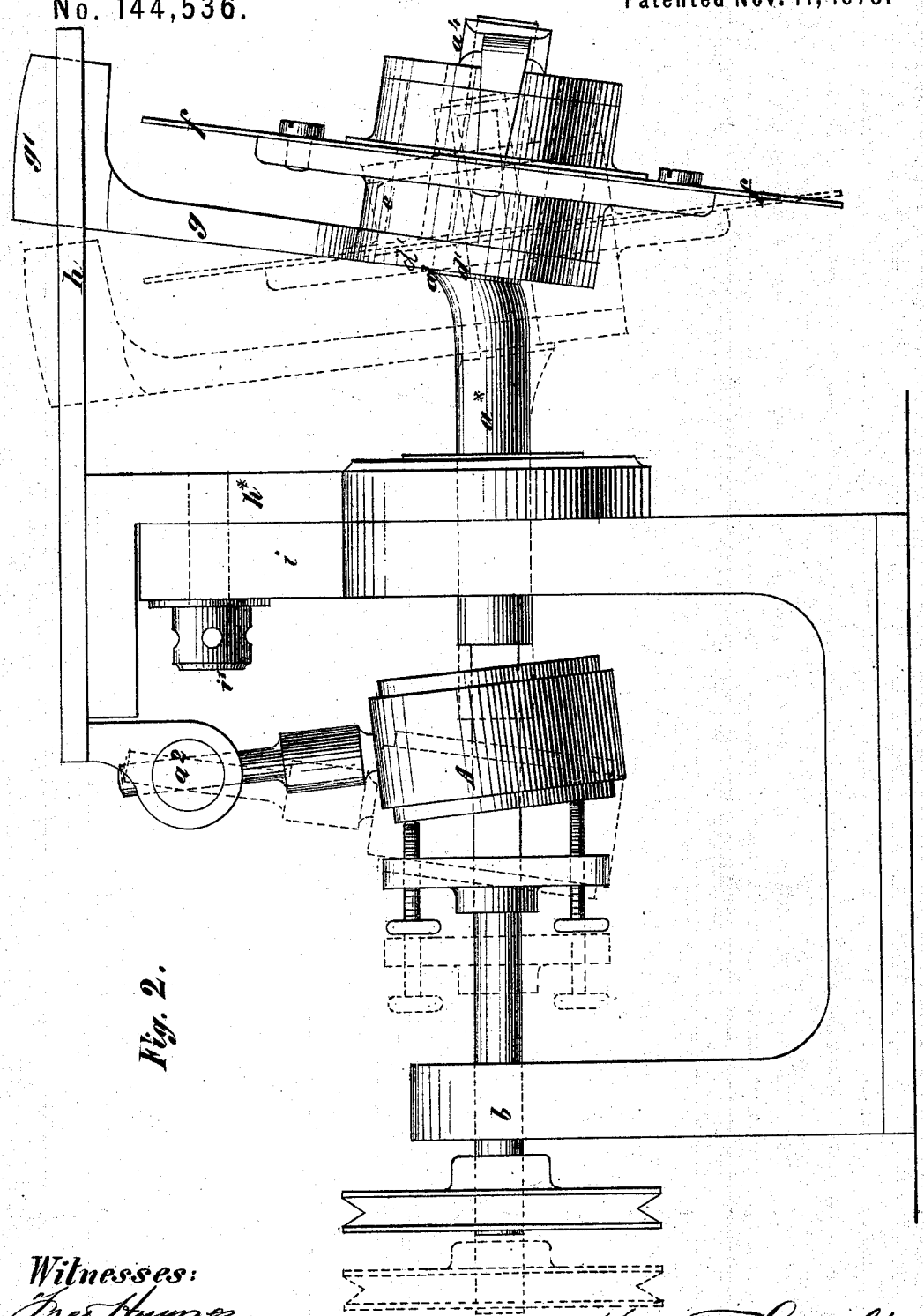

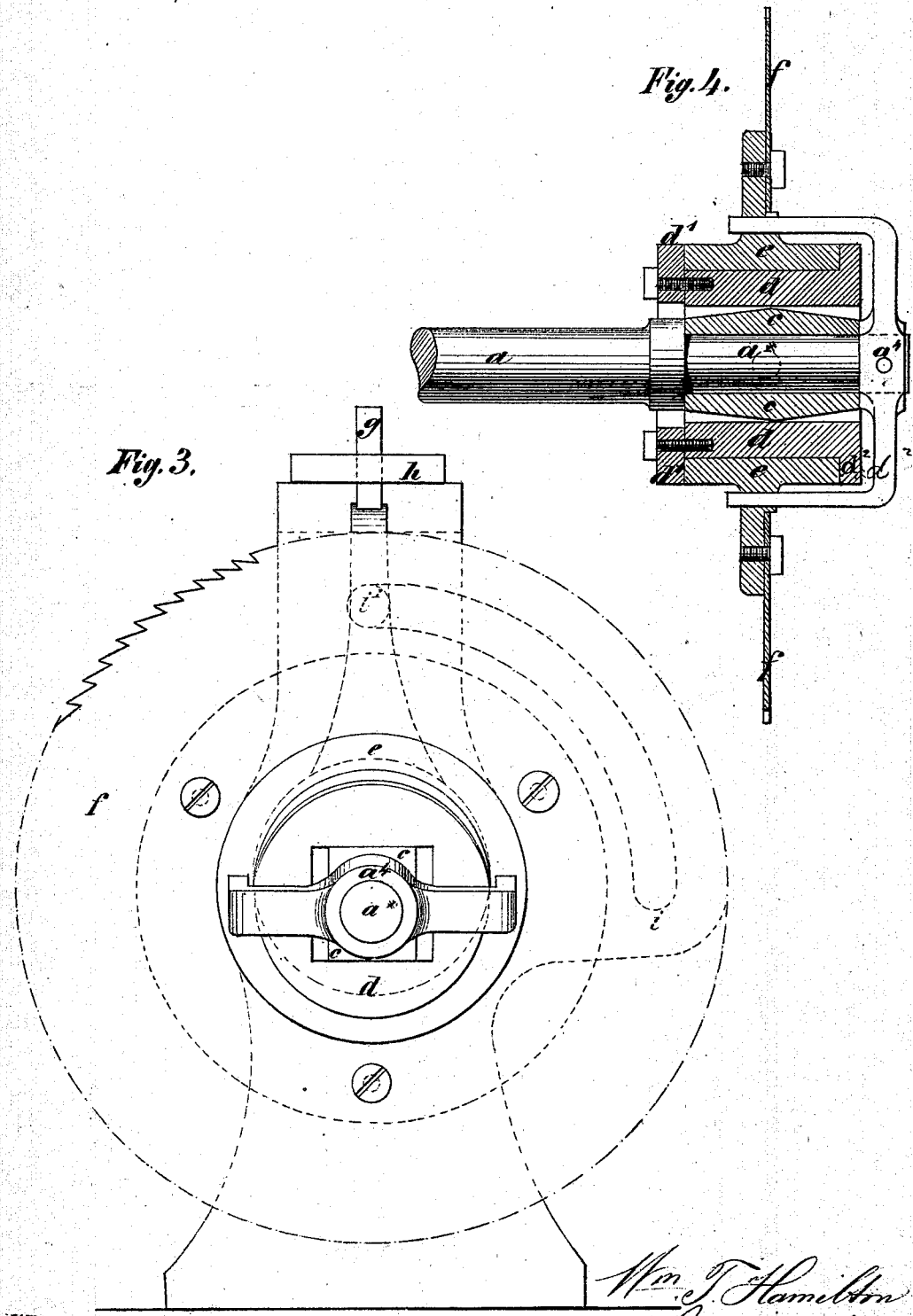

W. T. HAMILTON.
Machinery for Cutting Dovetails.

No. 144,536. Patented Nov. 11, 1873.

Witnesses: Wm T. Hamilton
per Brown & Allen
Attorneys

W. T. HAMILTON.
Machinery for Cutting Dovetails.

No. 144,536.

Patented Nov. 11, 1873.

5 Sheets--Sheet 5.

Witnesses:
Fred Hayner
Ferd Lurah

Wm. T. Hamilton
per Brown & Allen
attorneys

UNITED STATES PATENT OFFICE.

WILLIAM T. HAMILTON, OF RATHMINES, DUBLIN, IRELAND.

IMPROVEMENT IN MACHINERY FOR CUTTING DOVETAILS.

Specification forming part of Letters Patent No. 144,536, dated November 11, 1873; application filed March 10, 1873.

*To all whom it may concern:*

Be it known that I, WILLIAM TIGHE HAMILTON, of Rathmines, Dublin, Ireland, barrister-at-law, have invented certain Improvements in Machinery for Cutting Dovetails, of which the following is a specification:

The object of this invention of improvements in machinery for cutting dovetails is to cause a circular saw, while in rapid rotation, to swing to and fro, so as to cut wedge-form spaces out of any object suitably offered to it. In the accompanying drawings, I have shown various views of an arrangement of mechanism whereby this object may be effected with facility, precision, and dispatch.

Figure 5:
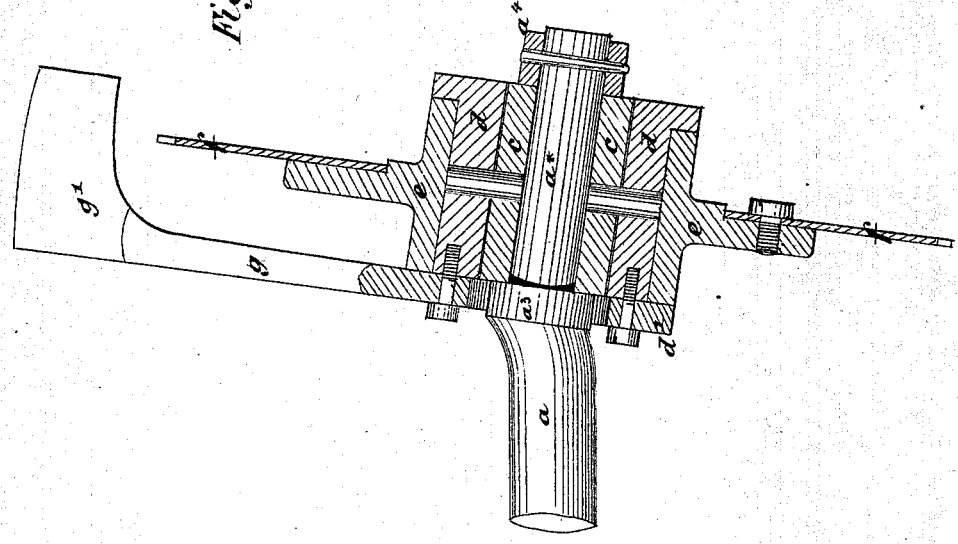

Figure 1 is a plan view of the principal working parts of a machine for cutting dovetails. Fig. 2 is a side elevation of the same. Fig. 3 is an end elevation, and Fig. 4 is a horizontal section taken through the boss of the circular saw; and Fig. 5 is a vertical section of the same.

The improved machine is thus constructed: An axle, $a$, is mounted in bearings $b\ b$, so as to be free to reciprocate endwise as it rotates. A portion of this axle is cranked at one end, as at $a^*$, Fig. 2, at such a degree of obliquity to its central line as is necessary to produce the required angle in the dovetails. This central line intersects that of the cranked portion $a^*$, or crank-pin, at the middle point of the latter. Upon this crank-pin $a^*$ a sleeve-shaft, $c$, is mounted, so as to be free to revolve on it when kept in position by suitable collars $a^3\ a^4$. Two opposite sides of this sleeve-shaft are flattened, while the other two sides are beveled in both directions from the middle of the piece, as shown at Figs. 3 and 4. A circular boss, $d$, having a hole through it (in the line of its axis) corresponding with the flattened shape of the sleeve-shaft $c$, is mounted on it by means of pivots or gimbals, which pass through it, and through such flattened sides, as shown at Fig. 5, so that the boss $d$ may swivel on the shaft $c$. For this purpose freedom is made at the other two sides of the hole through the boss by beveling them off from the center, as already explained. The line of the pivots is through the middle point of the crank-pin $a^*$, and in the same plane as the central lines of the crank-pin $a^*$ and axle $a$. A flanged hoop or strap, $e$, carrying a circular saw, $f$, is mounted on the boss $d$, so as to revolve on it when kept in position by the plate $d^1$ on one side of it, and the flange $d^2$ fixed to its ends. When the boss $d$ is carried round by a suitable driver fixed upon the axle, the saw $f$, of course, rotates with it. The plate $d^1$ carries an arm, $g$, which acts as a guide-bar, as it extends beyond the circumference of the saw, and there carries a block, $g'$, at right angles to the plate $d^1$, and which block works in a slot in the arm or frame $h$, as seen in Figs. 1 and 2. The arm or frame $h$ is so mounted on a head, $h^*$, concentric with the axle $a$, that the slot in the arm $h$ shall be always parallel to the axle $a$. The frame $h^*$, with arm $h$ and its appendages, turns through a quadrant-piece, $i$, (shown by dots in Fig. 3;) and it can be fixed by means of a set-screw, $i'$, either when a line through the slot and axle is horizontal, or when such line is vertical. Thus the action of the block $g'$ and the slot in the guide-bar $h$ will maintain the saw in planes which intersect in a vertical line through the axle $a$ when the axle and slot line is horizontal, but in a horizontal line through the axle when such axle and slot line is vertical. These positions are attained by moving the slot-frame $h$ through its quadrant, (shown by dots in Fig. 3;) then, when the axle $a$ is caused to rotate by any of the usual means, such as by means of a driving-band passed around the pulley at the end of the axle, the crank-pin $a^*$, as it turns in the sleeve-shaft $c$, compels the saw-hoop $e$ and the saw $f$ to swing to and fro, as indicated by the dots in Fig. 2, as it revolves in continually-varying planes which intersect, as above described.

To cut a dovetail mortise, the board or other piece in which it is to be cut is moved past the saw in a direction at right angles to the axis $a$, and perpendicular to the axial direction of the arm $g$ on the opposite side of the axle to that on which the arm $h$ is situated—for instance, when the arms $h$ and $g$ are directly over the axle, the board is moved horizontally under it. In like manner the saw will cut the side of a dovetail, or the sides of two adjacent dovetails, at once. If, on the other hand, while the arms $g$ and $h$ are in the same position, as above described, the board or piece is moved endwise horizontally toward the axle, a mortise will be cut widening in taper form toward both ends; or, in like manner, there may be cut the sides of two pins, the transverse sectional form of which will be that of a double wedge.

The action of the saw may be modified to obtain various widths or sizes of mortises, dovetails, or pins by imparting an endwise reciprocating motion to the axle $a$ by means of the mechanism shown at A, which I call a reciprocator, and for which I have applied for Letters Patent concurrently with this application.

This reciprocator is mounted on the axle $a$ in an inclined position, at which it may be fixed by means of set-screws, as shown at Fig. 2. The central part is also kept from rotating by means of a pin, which passes through a stub, $a^2$, which, in this arrangement, is a fixed point. When the reciprocator A is at the extreme position of its inclination it will be opposite to that of the saw when at its extreme position. The throw thus obtained for the axle $a$ will proportionally counteract the sweep of the cutting portions of the saw. The intersection of its varying planes will no longer be in a line which passes through the axle, but in a parallel line at any desired distance in front of the axle for cutting tails, or above the axle for cutting pins. Thus all desired sizes of tails and pins can be obtained, and their mutual adjustment can be effected by altering the inclination of the reciprocator A by means of its adjusting-screws, as shown at Fig. 2.

The mode of cutting tails or mortises may be so modified that they may be cut by a horizontal, instead of a vertical, feed—that is, the operation may be effected by moving the wood end on, as in the case of pins or tenons, instead of raising and lowering it. An arrangement to effect this object is shown at Figs. 6 and 7, Sheet V.

It will be obvious that the endwise motion of the axle $a$, caused by the reciprocator A, may be made to depend either on the degree of inclination of the reciprocator A to the axle $a$, or on the distance of the stud of the reciprocator from the axle. If, then, the reciprocator A be fixed at the same angle of inclination as the crank of the axle, and provision be made by suitable gearing so that the stud $a^2$ of the reciprocator A shall be made to approach the axle at the same rate as the table which carries the wood up against the saw, and if it be also provided that the operation shall be commenced with the reciprocator at the extreme of its throw—that is, when the intersection of the saw shall be where it enters the wood—the cutting parts of the saw will, as it were, expand according as the wood advances, and will contract again according as it recedes, leaving a tail cut to whatever depth the wood may have been advanced.

Figure 6:
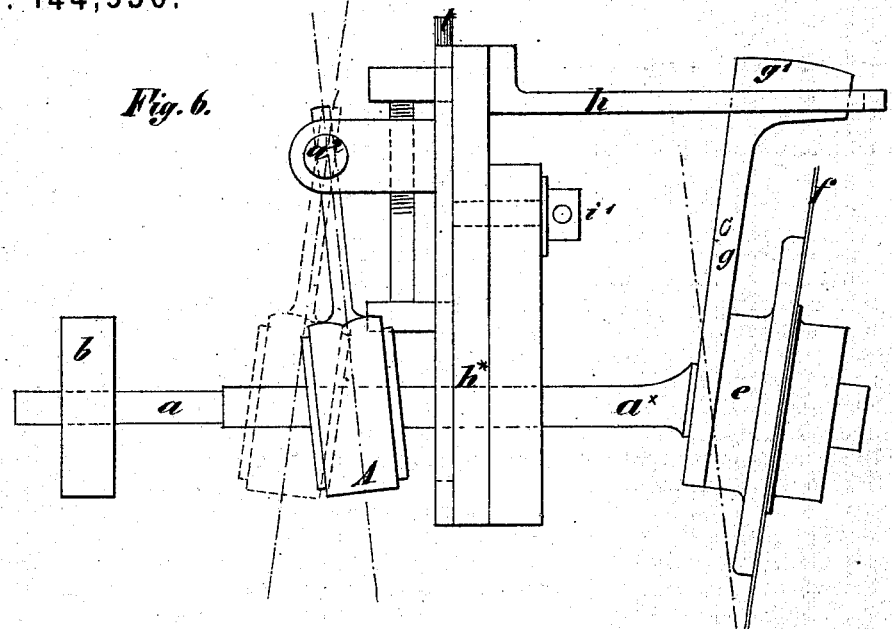
Figure 7:
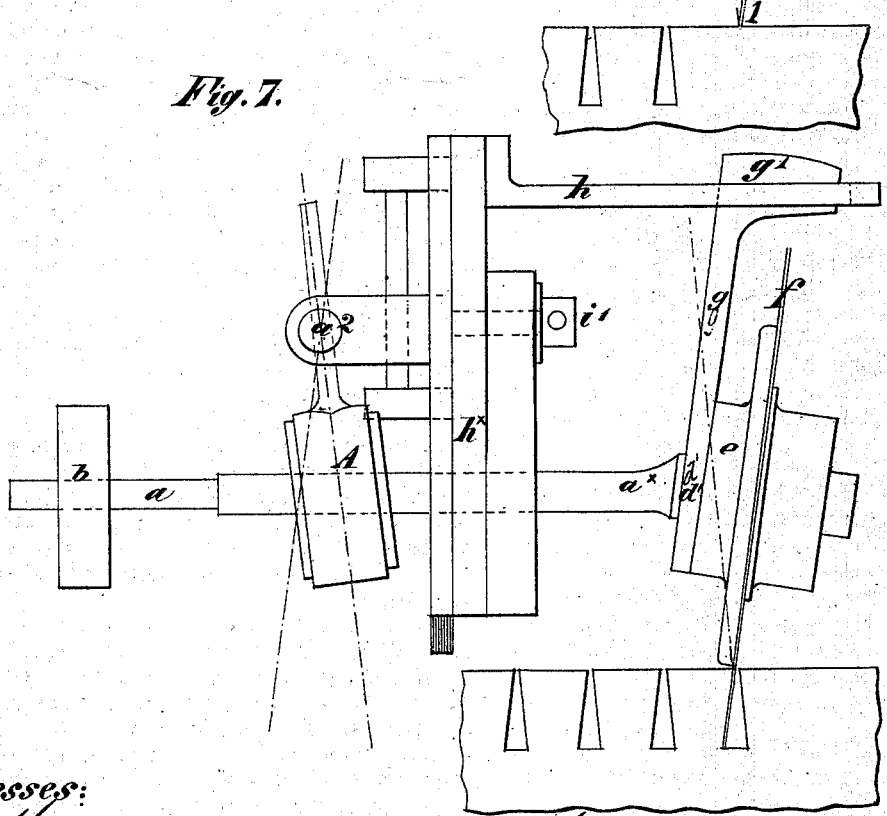

In Figs. 6 and 7, the reciprocator A is permanently fixed on the axle $a$ at its extreme angular position; but, in order to vary, or lengthen and shorten, the endwise motion of the axle $a$, the position of the stud $a^2$ admits of variation. To this end, this stud is connected to a sliding piece, $t$, which is capable of moving in guides in the frame, so that by drawing down the stud $a^2$, as shown at Fig. 7, the endwise motion of the axle $a$ will be correspondingly shortened, and this will necessarily affect the action of the saw on the cranked end of the shaft to such an extent that, whereas the edge of the saw at the point 1 in Fig. 6 always traveled through this point while the stud $a^2$ of the reciprocator is at its highest point, the edge of the saw would have a reciprocating motion when the stud is moved down, as at Fig. 7, and would consequently cut a dovetail, as shown in that figure. The motion of the stud $a^2$, and its action on the saw, may be made automatic by connecting the piece $t$, by means of a lever, to the moving table, on which the wood is placed.

Any convenient form of feeding-table may be used having proper horizontal, vertical, and traversing movements. These parts are not shown, because they form no portion of the present invention.

As the radial motion of the saw $f$ will cause the inside or bottoms of the tails to be slightly curved, its teeth should be ranged against a flat file or stone, and then sharpened. The saw will thus become slightly elliptic; but a circular saw is the proper shape for cutting pins. Therefore, where very exact work is required, different saws should be used for each distinct operation.

Having now described my invention of improvements in machinery for cutting dovetails, and having explained the manner of carrying the same into effect, I claim as my invention—

1. A circular saw mounted on an axle to which a reciprocating endwise motion, as well as a rotary motion, is simultaneously imparted, as herein set forth, for the purpose of cutting dovetails.

2. The combination of the parts $c$, $d$, $d^1$, $e$, and $f$ with the crank-pin $a^*$ of the reciprocating and rotating axle $a$.

3. The combination of the parts $g$ $g'$ $h$ $h^*$ and the quadrant-piece $i$ with the devices for operating the saw, as and for the purposes herein set forth.

WM. TIGHE HAMILTON.

Witnesses:
  H. K. WHITE,
    66 *Chancery Lane, London.*
  J. B. WYNN,
    24 *Royal Exchange, London.*